US012327504B2

(12) United States Patent
Hong et al.

(10) Patent No.: US 12,327,504 B2
(45) Date of Patent: Jun. 10, 2025

(54) DRIVING DEVICE AND DRIVING METHOD OF ELECTROLUMINESCENT DISPLAY APPARATUS

(71) Applicant: LG Display Co., Ltd., Seoul (KR)

(72) Inventors: Moo Kyoung Hong, Paju-si (KR); Dong Kyu Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 124 days.

(21) Appl. No.: 18/471,897

(22) Filed: Sep. 21, 2023

(65) Prior Publication Data

US 2024/0212539 A1 Jun. 27, 2024

(30) Foreign Application Priority Data

Dec. 27, 2022 (KR) ........................ 10-2022-0185470

(51) Int. Cl.
*G09G 3/3233* (2016.01)
*G09G 3/00* (2006.01)

(52) U.S. Cl.
CPC ........... *G09G 3/006* (2013.01); *G09G 3/3233* (2013.01); *G09G 2300/0452* (2013.01); (Continued)

(58) Field of Classification Search
CPC ................. G09G 3/006; G09G 3/3233; G09G 2300/0452; G09G 2300/0819; G09G 2300/0842; G09G 2310/0251; G09G 2320/0233; G09G 2320/045; G09G 2330/08; G09G 2330/12; G09G 3/3291; G09G 3/30; G09G 2310/0202; G09G 2310/0243; G09G 2310/0264; G09G 2320/0271; G09G 3/3208; (Continued)

(56) References Cited

U.S. PATENT DOCUMENTS

| | | | | |
|---|---|---|---|---|
| 10,269,278 B2 * | 4/2019 | Lin | G09G 3/006 | |
| 12,094,425 B2 * | 9/2024 | Hong | G09G 3/3291 | |
| 2023/0215358 A1 * | 7/2023 | Park | G09G 3/3233 345/76 | |

* cited by examiner

*Primary Examiner* — Rodney Amadiz
(74) *Attorney, Agent, or Firm* — Seed IP Law Group LLP

(57) ABSTRACT

A driving device of an electroluminescent display apparatus, including a display panel where a pixel line including a set of pixels is provided in plurality, includes a pixel line determiner configured to select a representative pixel line, disposed at a position at which an accumulation stress caused by repetitive display of an input image is largest, from among all pixel lines, an over driving control controller configured to select a sample pixel characteristic value from among pixel characteristic values of the representative pixel line and selectively output a first ODC control signal and a second ODC control signal, based on a magnitude of the sample pixel characteristic value, and a sensing and driving circuit configured to pre-sense pixel characteristic values of the representative pixel line in the first sensing period, perform ODC sensing on the pixel characteristic values of the all pixel lines once each according to the first ODC control signal in a second sensing period succeeding the first sensing period, and perform the ODC sensing on the pixel characteristic values of the all pixel lines a plurality of times each according to the second ODC control signal in the second sensing period, wherein a sensing data voltage supplied to each pixel of the all pixel lines has multi-voltage levels, in the second sensing period for the ODC sensing.

20 Claims, 11 Drawing Sheets

(52) U.S. Cl.
CPC ............... *G09G 2300/0819* (2013.01); *G09G 2300/0842* (2013.01); *G09G 2310/0251* (2013.01); *G09G 2320/0233* (2013.01); *G09G 2320/045* (2013.01); *G09G 2330/08* (2013.01); *G09G 2330/12* (2013.01)

(58) Field of Classification Search
CPC ....... G09G 2300/0439; G09G 2310/08; G09G 2320/043; H10K 59/351
See application file for complete search history.

DRIVING DEVICE AND DRIVING METHOD OF ELECTROLUMINESCENT DISPLAY APPARATUS

CROSS-REFERENCE TO RELATED APPLICATIONS

This application claims the benefit of the Korean Patent Application No. 10-2022-0185470 filed on Dec. 27, 2022, which is hereby incorporated by reference as if fully set forth herein.

BACKGROUND

Technical Field

The present disclosure relates to a driving device and a driving method of an electroluminescent display apparatus.

Description of the Related Art

Each of pixels of electroluminescent display apparatuses includes a light emitting device self-emitting light and a driving element, and each pixel controls a driving current flowing in a driving element with a data voltage based on a gray level of image data to adjust luminance.

A threshold voltage of a driving element may be shifted in pixels as a driving time elapses. In this case, a driving current generated by a driving element may vary between pixels even when the same data voltage is applied. A deviation of the driving current causes luminance non-uniformity to degrade image quality.

In electroluminescent display apparatuses, compensation technology has been known where a sensing value is obtained by sensing a threshold voltage of a driving element included in each pixel and image data to be input to each pixel is corrected based on the sensing value.

BRIEF SUMMARY

The present disclosure may provide a driving device and a driving method of an electroluminescent display apparatus, which may shorten a sensing time of a threshold voltage of a driving element to enhance compensation performance.

A driving device of an electroluminescent display apparatus, including a display panel where a pixel line including a set of pixels is provided in plurality, includes a pixel line determiner configured to select a representative pixel line, disposed at a position at which an accumulation stress caused by repetitive display of an input image is largest, from among all pixel lines, an over driving control (ODC) controller configured to select a sample pixel characteristic value from among pixel characteristic values of the representative pixel line and selectively output a first ODC control signal and a second ODC control signal, based on a magnitude of the sample pixel characteristic value, and a sensing and driving circuit configured to pre-sense pixel characteristic values of the representative pixel line in the first sensing period, perform ODC sensing on the pixel characteristic values of the all pixel lines once each according to the first ODC control signal in a second sensing period succeeding the first sensing period, and perform the ODC sensing on the pixel characteristic values of the all pixel lines a plurality of times each according to the second ODC control signal in the second sensing period, wherein a sensing data voltage supplied to each pixel of the all pixel lines has multi-voltage levels, in the second sensing period for the ODC sensing.

In another aspect of the present disclosure, a driving method of an electroluminescent display apparatus, including a display panel where a pixel line including a set of pixels is provided in plurality, includes selecting a representative pixel line, disposed at a position at which an accumulation stress caused by repetitive display of an input image is largest, from among all pixel lines, pre-sensing pixel characteristic values of the representative pixel line in a first sensing period, selecting a sample pixel characteristic value from among the pixel characteristic values of the representative pixel line and selectively outputting a first over driving control (ODC) control signal and a second ODC control signal, based on a magnitude of the sample pixel characteristic value, and performing ODC sensing on the pixel characteristic values of the all pixel lines once each according to the first ODC control signal and performing the ODC sensing on the pixel characteristic values of the all pixel lines a plurality of times each according to the second ODC control signal, in a second sensing period succeeding the first sensing period, wherein a sensing data voltage supplied to each pixel of the all pixel lines has two or more voltage levels, in the second sensing period for the ODC sensing.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
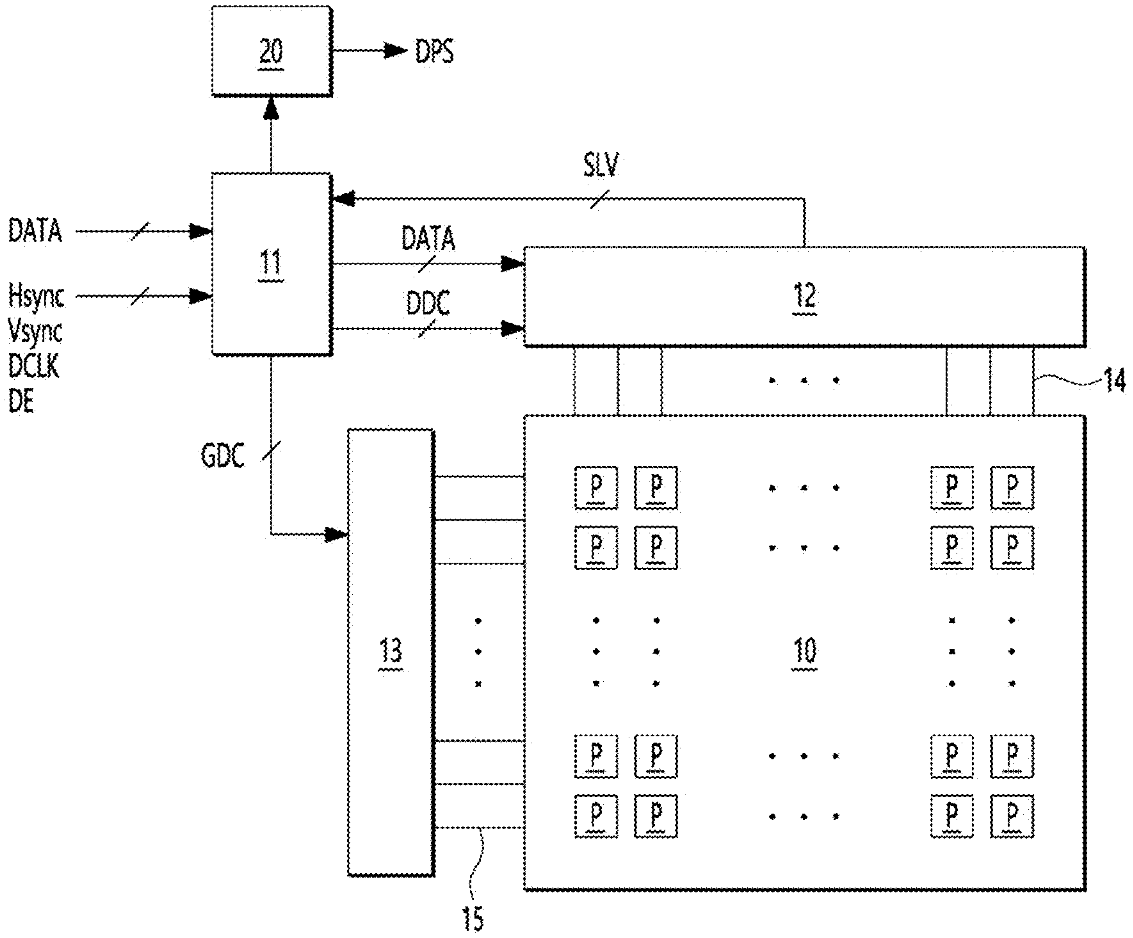
FIG. 1 is a block diagram illustrating an electroluminescent display apparatus according to the present embodiment.

Hereinafter, example embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

A scan signal (or a gate signal) applied to pixels may swing between a gate on voltage and a gate off voltage. The gate on voltage may be set to a voltage which is higher than a threshold voltage of a transistor, and the gate off voltage may be set to a voltage which is lower than the threshold voltage of the transistor. The transistor may be turned on in response to the gate on voltage and may be turned off in response to the gate off voltage. In N-channel transistors, the gate on voltage may be a gate high voltage (VGH), and the gate off voltage may be a gate low voltage (VGL). In P-channel transistors, the gate on voltage may be the gate low voltage (VGL), and the gate off voltage may be the gate high voltage (VGH).

Figure 2:
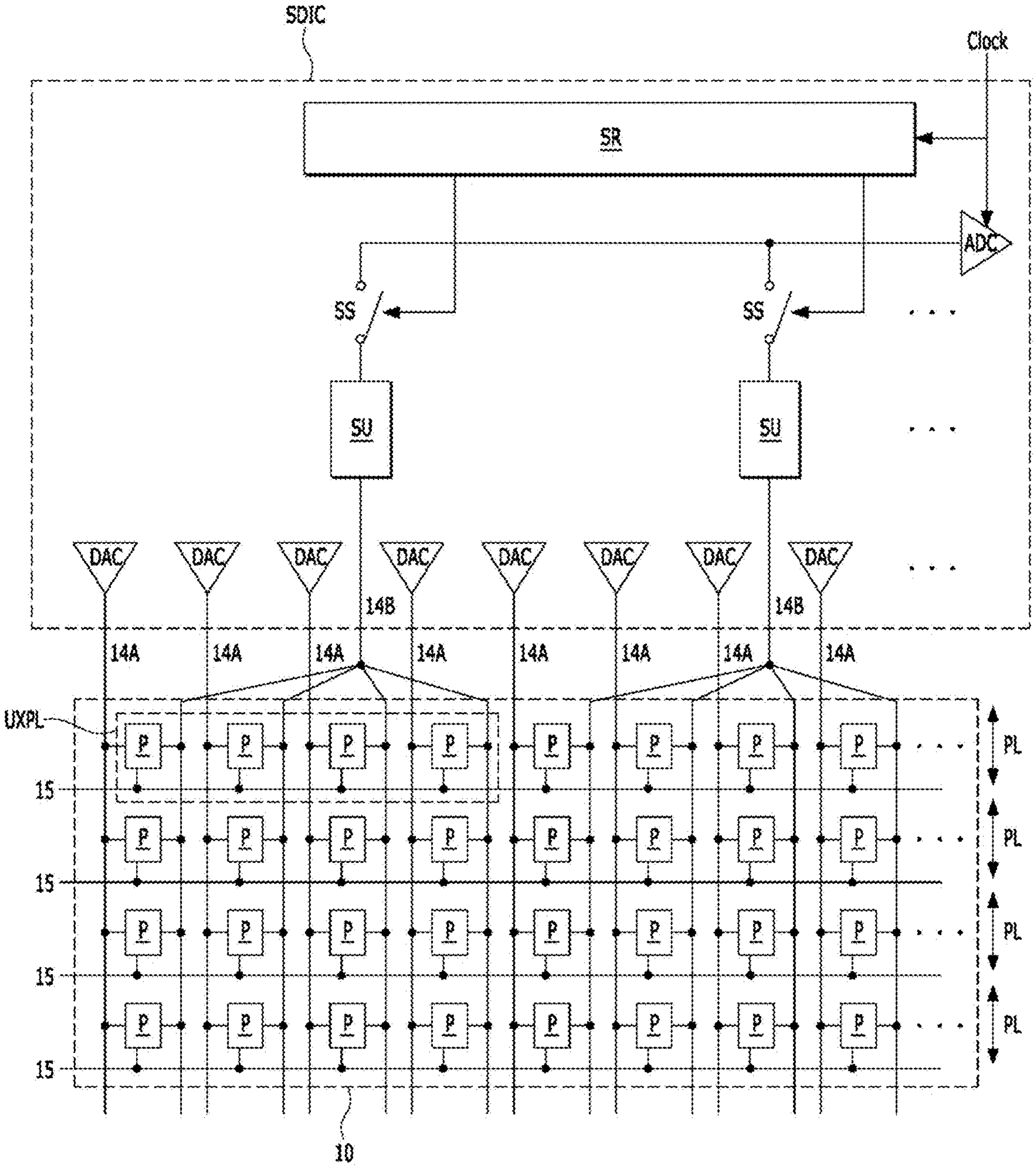
FIG. 2 is a diagram illustrating a connection configuration of a pixel array and a source driving integrated circuit (IC)

FIG. 1 is a block diagram illustrating an electroluminescent display apparatus according to the present embodiment. FIG. 2 is a diagram illustrating a connection configuration of a pixel array and a source driving integrated circuit (IC).

Referring to FIGS. 1 and 2, the electroluminescent display apparatus according to the present embodiment may include a display panel 10, a timing controller 11, a data driving circuit 12, a gate driving circuit 13, a sensing circuit SU, and a power circuit 20. The sensing circuit SU may be embedded in the data driving circuit 12, but is not limited thereto.

In a screen displaying an input image in the display panel 10, first signal lines 14 extending in a column direction (or a vertical direction) may intersect with second signal lines 15 extending in a row direction (or a horizontal direction), and a plurality of pixels P may be respectively provided in a plurality of intersection areas and may be arranged as a matrix type to configure a pixel array. The first signal lines 14 may include a plurality of data lines 14A through which data voltages are supplied and a plurality of reference voltage lines 14B through which a reference voltage is supplied. The reference voltage lines 14B may connect the pixels P with the sensing circuit SU and may be referred to as a sensing line. The second signal lines 15 may be gate lines through which scan signals are supplied.

The pixel array may include a plurality of pixel lines PL. Here, the pixel line PL may not denote a physical signal line but may be referred to as a pixel set of pixels of one line arranged adjacent to one another in a horizontal direction or referred to as a pixel block of pixels of one line. The pixels P may be grouped into a plurality of groups and may implement various colors. When a pixel group for implementing colors is referred to as a unit pixel UPXL, one unit pixel UPXL may include red (R), green (G), blue (B), and white (W) pixels. The R, G, B, and W pixels configuring the one unit pixel UPXL may be arranged adjacent to one another in a horizontal direction and may be designed to share the same reference voltage line 14B, and thus, the pixel array may be simplified.

The timing controller 11 may correct digital video data DATA input from a host system, based on a compensation value for compensating for a pixel characteristic value deviation, and then, may supply corrected digital image data DATA to the data driving circuit 12. A pixel characteristic value may be a threshold voltage of a driving element included in each of the pixels P. The pixel characteristic values of the pixels P may be obtained through an off sequence sensing operation described below.

The timing controller 11 may receive a timing signal such as a vertical synchronization signal Vsync, a horizontal synchronization signal Hsync, a data enable signal DE, and a dot clock DCLK from the host system and may generate timing control signals suitable for a display mode and a sensing mode. The timing control signals may include a gate timing control signal GDC for controlling an operation timing of the gate driving circuit 13 and a data timing control signal DDC for controlling an operation timing of the data driving circuit 12. In a case where the sensing circuit SU is embedded in the data driving circuit 12, the data timing control signal DDC may include an initialization control signal SPRE and a sampling control signal SAM of FIG. 3.

The timing controller 11 may obtain a characteristic value sensing value of each pixel in the sensing mode, calculate a compensation value of each pixel on the basis of the characteristic value sensing value, and store the calculated compensation value in a memory. The timing controller 11 may download the compensation value from the memory in the display mode and may correct the digital image data DATA of each pixel by using the compensation value to compensate for a threshold voltage deviation between the pixels P.

The data driving circuit 12 may include one or more source driving ICs SDIC. Each of the source driving ICs SDIC may include a latch array, a plurality of digital-to-analog converters DAC respectively connected to the data lines 14A, a plurality of sensing circuits SU respectively connected to the sensing lines 14B, a plurality of analog-to-digital converters ADC, a plurality of multiplex switches SS which selectively connect the sensing circuits SU to the analog-to-digital converters ADC, and a shift register SR which sequentially turns on the multiplex switches SS.

The latch array may latch the digital image data DATA input from the timing controller 11, based on the data control signal DDC, and may supply the latched digital image data DATA to the digital-to-analog converters DAC. In the display mode, the digital-to-analog converters DAC may convert the latched image data DATA into display data voltages and may supply the display data voltages to the data lines 14A. In the sensing mode, the digital-to-analog converters DAC may supply sensing data voltages having predetermined multi-voltage levels to the data lines 14A.

The sensing circuits SU and the analog-to-digital converters ADC may operate in the sensing mode and may stop an operation in the display mode.

The sensing circuit SU may supply a reference voltage Vpre to the sensing line 14B, based on the data control signal DDC, or may sense a pixel characteristic value input through the sensing line 14B and may supply the sensed pixel characteristic value to the analog-to-digital converter ADC. The analog-to-digital converter ADC may convert pixel characteristic values, input from the sensing circuits SU, into digital sensing values SLV and may transfer the pixel characteristic values to the timing controller 11.

The gate driving circuit 13 may generate a scan signal (SCAN of FIG. 3) suitable for the display mode and the sensing mode, based on the gate control signal GDC, and may supply the scan signal to the gate lines 15. The scan signal may include a display scan signal for a display operation and a sensing scan signal for a sensing operation. The sensing operation may be performed during an on period of the sensing scan signal. The on period of the sensing scan signal may define an off sequence sensing period. To secure sufficient sensing performance, the on period of the sensing scan signal may be longer than an on period of the display scan signal.

The power circuit 20 may generate a direct current (DC) power and an alternating current (AC) power needed for panel driving. The power circuit 20 may release the supply of the AC power (i.e., a system power) according to a control command of the timing controller 11 after the off sequence sensing period ends.

The driving device of the electroluminescent display apparatus according to the present embodiment may include the timing controller 11, the data driving circuit 12, the gate driving circuit 13, and the sensing circuit SU described above. The driving device of the electroluminescent display apparatus may use external compensation technology based on off sequence sensing, so as to compensate for a pixel characteristic value deviation between the pixels P. The off sequence sensing operation may be performed until before the system power (the AC power) is released in a state where a screen is not turned off.

The driving device of the electroluminescent display apparatus according to the present embodiment may perform an over driving control (ODC) sensing operation, based on a sensing data voltage having multi-voltage levels, and thus, may considerably shorten one sensing period corresponding to all pixels. When a pixel characteristic value variation of a display panel is large, the driving device of the electroluminescent display apparatus may repeatedly sense all pixels a plurality of times by using one sensing period which has been shortened, and thus, the accuracy of compensation and sensing may increase. To select whether to perform repeated sensing, the driving device of the electroluminescent display apparatus may select a representative pixel line on the basis of data counting and may further perform a pre-sensing operation on the representative pixel line.

Figure 3:
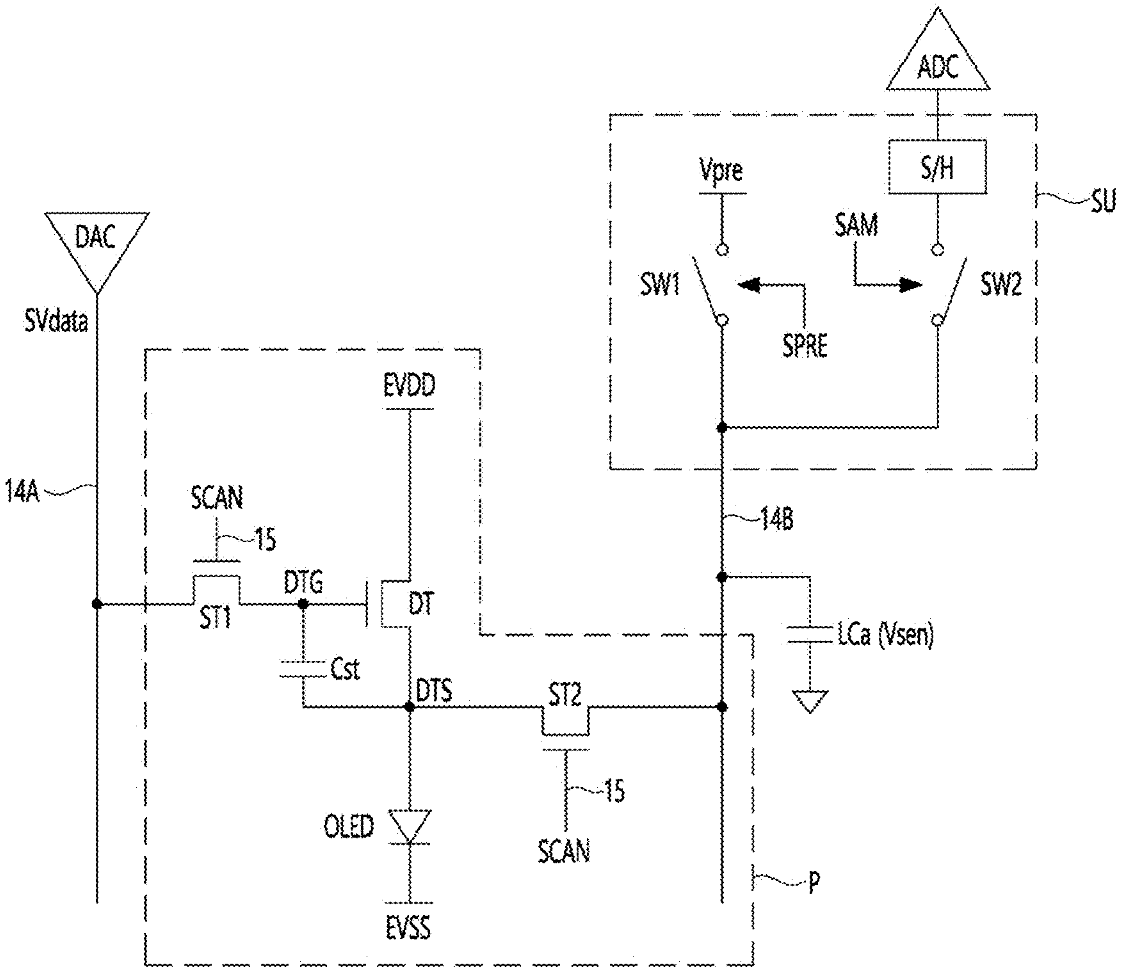
FIG. 3 is a diagram illustrating a connection configuration of a pixel and a sensing circuit.

FIG. 3 is a diagram illustrating a connection configuration of a pixel P and a sensing circuit SU.

Referring to FIG. 3, the pixel P may be implemented in a structure capable of a display operation and a sensing operation. The pixel P may include a light emitting device OLED, a driving transistor DT, a storage capacitor Cst, a first switch transistor ST1, and a second switch transistor ST2. The transistors DT, ST1, and ST2 may each be implemented as a thin film transistor (TFT). TFTs may be implemented as a P type, an N type, or a hybrid type where the P type and the N type are provided in common. Also, a semiconductor layer of a TFT may include amorphous silicon, polysilicon, or oxide.

The light emitting device OLED may include an anode electrode connected to a source node DTS, a cathode electrode connected to an input terminal of a low level driving voltage EVSS, and an organic compound layer disposed between the anode electrode and the cathode electrode. The organic compound layer may include a hole injection layer (HIL), a hole transport layer (HTL), an emission layer (EML), an electron transport layer (ETL), and an electron injection layer (EIL).

The driving transistor DT may be a driving element which controls a level of a drain-source current (hereinafter referred to as Ids) of the driving transistor DT input to the light emitting device OLED, based on a gate-source voltage (hereinafter referred to as Vgs) thereof. The driving transistor DT may include a gate electrode connected with a gate node DTG, a drain electrode connected with an input terminal of a high level driving voltage EVDD, and a source electrode connected with a source node DTS.

The storage capacitor Cst may be connected between the gate node DTG and the source node DTS and may hold the Vgs of the driving transistor DT during a predetermined period.

The first switch transistor ST1 may electrically connect a data line 14A with the gate node DTG, based on a scan signal SCAN from a gate line 15, and may allow a sensing data voltage SVdata to be charged into the gate node DTG. The first switch transistor ST1 may include a gate electrode connected with the gate line 15, a drain electrode connected with the data line 14A, and a source electrode connected with the gate node DTG.

The second switch transistor ST2 may electrically connect the source node DTS with the sensing line 14B, based on the scan signal SCAN, and thus, may allow a reference voltage Vpre to be charged into the source node DTS. Also, the second switch transistor ST2 may allow a source node voltage, corresponding to the Ids of the driving transistor DT, to be charged into a line capacitor LCa of the sensing line 14B. The second switch transistor ST2 may include a gate electrode connected with the gate line 15, a drain electrode connected with the sensing line 14B, and a source electrode connected with the source node DTS.

Referring to FIG. 3, the sensing circuit SU may be implemented as a voltage sensing type.

The sensing circuit SU may be for supplying the reference voltage Vpre to the pixel P and sampling a sensing voltage Vsen stored in the line capacitor LCa of the sensing line 14B and may include a reference voltage control switch SW1, a sampling switch SW2, and a sample and holder S/H. The reference voltage control switch SW1 may connect an input terminal of the reference voltage Vpre with the sensing line 14B, based on the reference control voltage signal SPRE. The sampling switch SW2 may connect the sensing line 14B with the sample and holder S/H, based on the sampling control signal SAM. The reference voltage control switch SW1 and the sampling switch SW2 may be turned on/off to be opposite to each other in performing an off sequence sensing operation.

A voltage charged into the line capacitor LCa may be the sensing voltage Vsen which is input to the sensing circuit SU. When a threshold voltage of the driving transistor DT is shifted by a degradation, the Ids of the driving transistor DT may be shifted, and thus, a level of the sensing voltage Vsen may be shifted. Accordingly, a threshold voltage variation of the driving transistor DT may be determined based on a level of the sensing voltage Vsen.

The sample and holder S/H may sample and hold the sensing voltage Vsen stored in the line capacitor LCa of the sensing line 14B while the sampling switch SW2 is being turned on, and then, may transfer a sampled sensing voltage to the analog-to-digital converter ADC.

Figure 4:
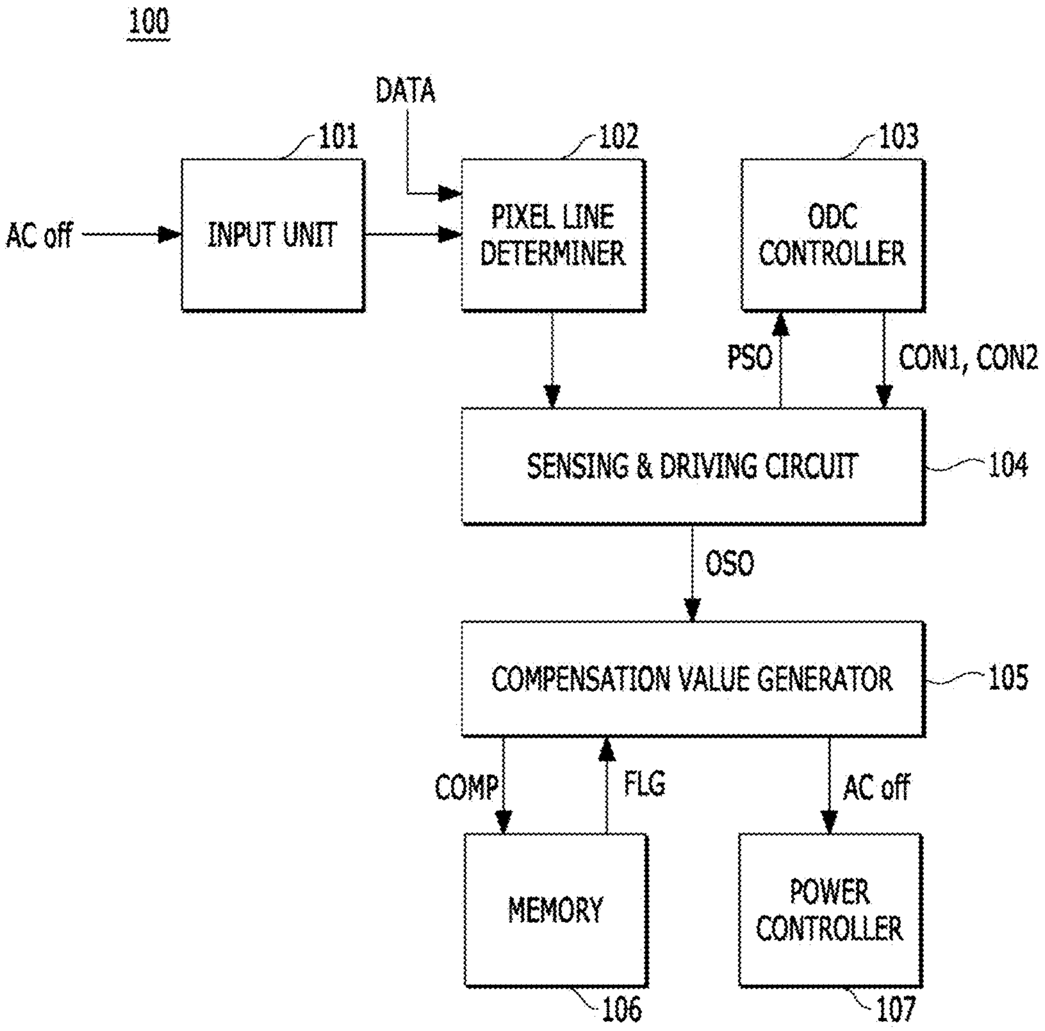
FIG. 4 is a block diagram illustrating a driving device of an electroluminescent display apparatus according to the present embodiment.
Figure 5:
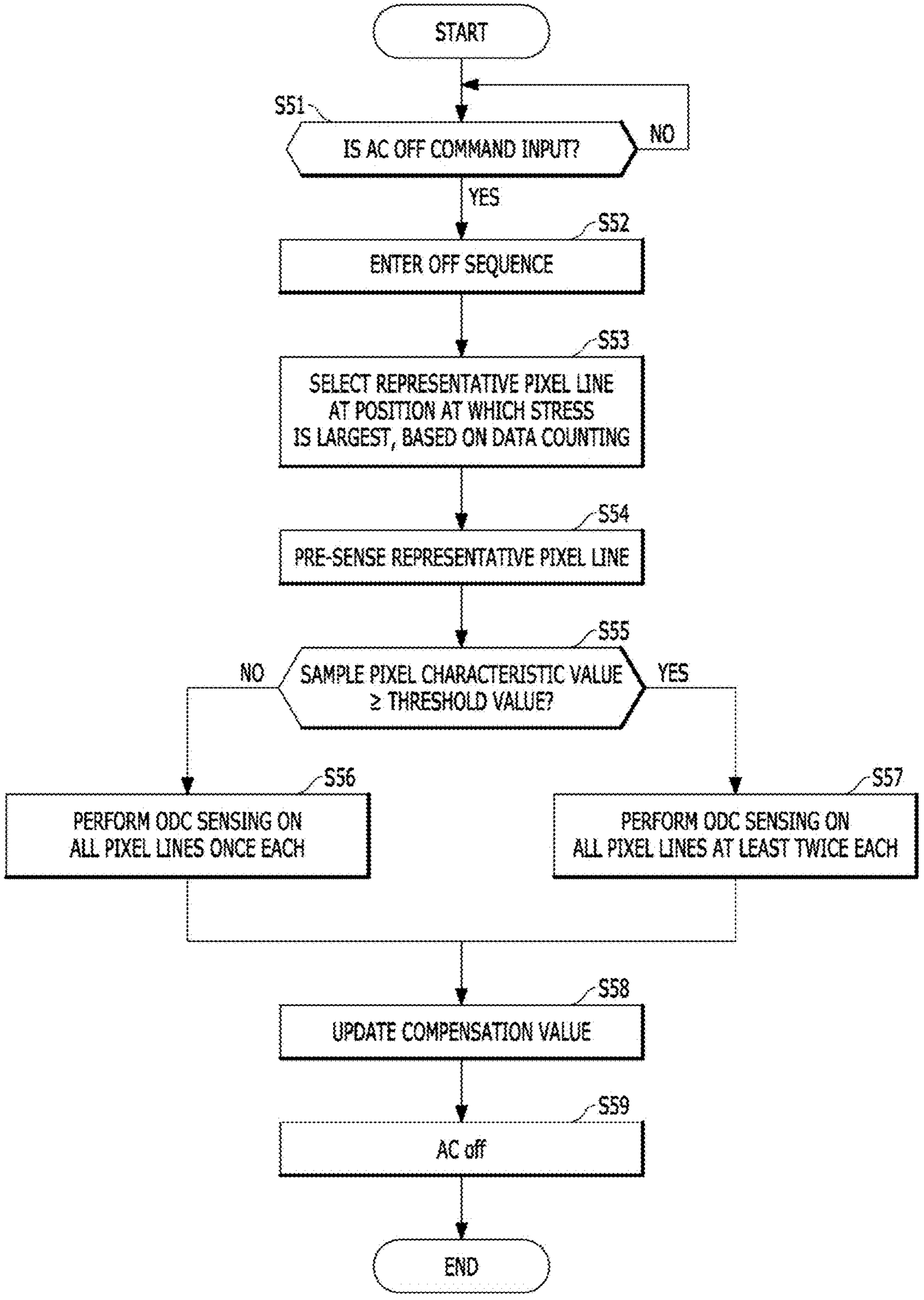
FIG. 5 is a flowchart illustrating a driving method of an electroluminescent display apparatus according to the present embodiment.
Figure 6:
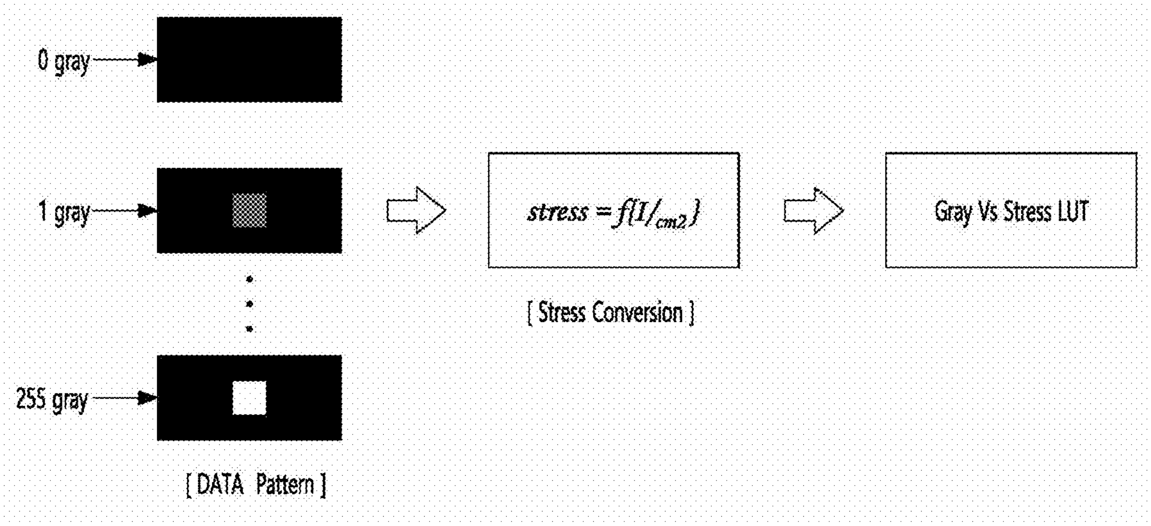
FIG. 6 is a diagram illustrating a stress calculation process based on data counting.
Figure 7:
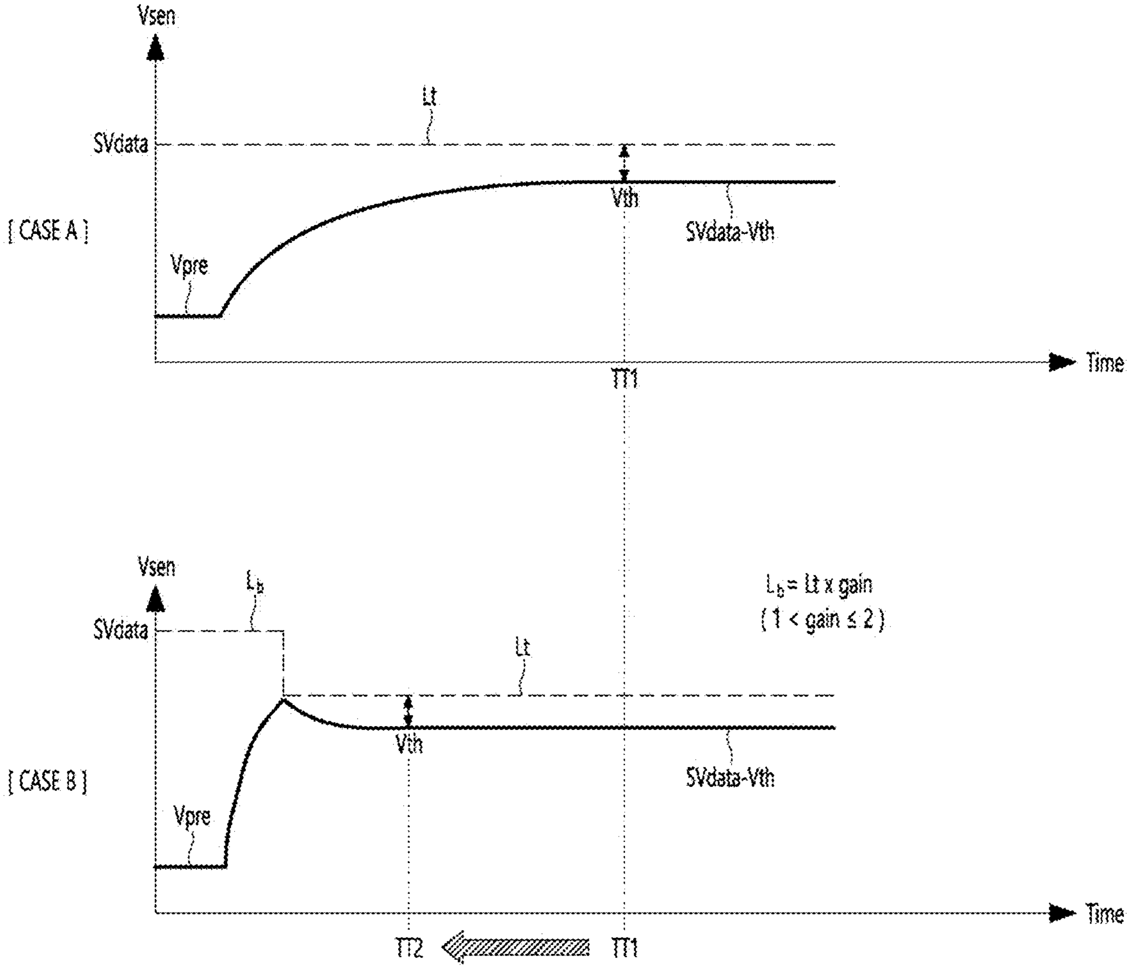
FIG. 7 is a diagram illustrating an example where a sensing time is shortened more in an over driving control (ODC) sensing method than a normal sensing method.

FIG. 4 is a block diagram illustrating a driving device 100 of an electroluminescent display apparatus according to the present embodiment. FIG. 5 is a flowchart illustrating a driving method of an electroluminescent display apparatus according to the present embodiment. FIG. 6 is a diagram illustrating a stress calculation process based on data counting. FIG. 7 is a diagram illustrating an example where a sensing time is shortened more in an ODC sensing method than a normal sensing method.

Referring to FIG. 4, the driving device 100 of the electroluminescent display apparatus according to the present embodiment may include an input unit 101, a pixel line determiner 102, an ODC controller 103, a sensing and driving circuit 104, a compensation value generator 105, a memory 106, and a power controller 107. A driving method of the driving device 100 of the electroluminescent display apparatus may be described with reference to FIG. 5.

When an AC power off command is input from a user, the input unit 101 may inform the pixel line determiner 10 of a start of an off sequence sensing operation (S51, S52).

The pixel line determiner 102 may select a representative pixel line, disposed at a position at which an accumulation stress caused by the repetitive display of an input image is largest, from among all pixel lines (S53). To this end, the pixel line determiner 102 may include a stress accumulation circuit.

The stress accumulation circuit, as in FIG. 6, may calculate a stress value corresponding to each gray level of input image data DATA with reference to a predetermined stress conversion lookup table. A stress value may represent the amount of shift of threshold voltage of a driving element with respect to an accumulation driving time. In the stress conversion lookup table, a stress value corresponding to each gray level of the input image data DATA may be mapped to an accumulation driving time. As a grayscale value increases and an accumulation driving time increases, a stress value may be output through the stress conversion lookup table.

The stress conversion lookup table may be previously generated by a stress value conversion algorithm. In a process of applying a data pattern, a current may be measured by applying a grayscale-based data pattern to a display panel in an initial state before a degradation. In a stress value conversion process, a measured current value may be converted into a stress value by using a predetermined function equation.

The sensing and driving circuit 104 may pre-sense the representative pixel line in a first sensing period and may perform ODC sensing on pixel characteristic values of all pixel lines in a second sensing period. The sensing and driving circuit 104 may be implemented with the data driving circuit 12, the gate driving circuit 13, and the sensing circuit SU described above.

The sensing and driving circuit 104 may pre-sense pixel characteristic values (i.e., threshold voltages of a driving element) of the representative pixel line in the first sensing period. The sensing and driving circuit 104 may pre-sense the pixel characteristic values of the representative pixel line on the basis of a sensing data voltage SVdata having a single voltage level Lt as in a case A of FIG. 7, or may pre-sense the pixel characteristic values of the representative pixel line on the basis of the sensing data voltage SVdata having multi-voltage levels Lb and Lt as in a case B of FIG. 7. The case A may represent a variation of the sensing voltage Vsen based on the normal sensing method, and the case B may represent a variation of the sensing voltage Vsen based on the ODC sensing method.

The Ids proportional to a difference voltage Vgs between the sensing data voltage SVdata and the reference voltage Vpre may flow in a driving element of each pixel included in the representative pixel line in the first sensing period, and a source node voltage (i.e., the sensing voltage Vsen) of the driving element may progressively increase based on the Ids. An increase operation of the sensing voltage Vsen may be continued until the driving element is turned off, based on a voltage following scheme. Also, the sensing voltage Vsen may be saturated to "SVdata-Vth" from a timing at which the driving element is turned off.

To shorten the first sensing period, a saturation timing of the sensing voltage Vsen should be advanced. Because the saturation timing of the sensing voltage Vsen is based on a rising slope of the sensing voltage Vsen, the ODC sensing method where a rising slope is relatively steep may be easier to shorten a sensing period than the normal sensing method. For example, a saturation timing may be "TT1" in the case A of FIG. 7 and may be "TT2" in the case B. In this case, "TT2" may be earlier than "TT1."

The sensing and driving circuit 104 may supply the ODC controller 103 with pixel characteristic values PSO of the representative pixel line pre-sensed in the first sensing period.

The ODC controller 103 may select, as a sample pixel characteristic value, a highest value of the pixel characteristic values PSO of the representative pixel line. The sample pixel characteristic value may be a pixel characteristic value of a pixel, where a threshold voltage variation of a driving element is largest, of pixels included in the representative pixel line.

The ODC sensing controller 103 may selectively output a first ODC sensing control signal CON1 and a second ODC sensing control signal CON2, based on a magnitude of the sample pixel characteristic value. The ODC controller 103 may output the first ODC control signal CON1 when the sample pixel characteristic value is less than a predetermined threshold value, and when the sample pixel characteristic value is greater than or equal to the predetermined threshold value, the ODC controller 103 may output the second ODC control signal CON2 (S55).

The sensing and driving circuit 104 may perform ODC sensing on all pixel lines by using the second sensing period.

The sensing and driving circuit 104 may perform ODC sensing on pixel characteristic values of all pixel lines once each, based on the first ODC control signal CON1 and may perform ODC sensing on the pixel characteristic values of all pixel lines a plurality of times each, based on the second ODC control signal CON2 (S56, S57).

The sensing and driving circuit 104 may perform ODC sensing on the pixel characteristic values of all pixel lines on the basis of the sensing data voltage SVdata having the multi-voltage levels Lb and Lt as in the case B of FIG. 7, thereby reducing a sensing period. The sensing data voltage SVdata having the multi-voltage levels Lb and Lt may have a boosting voltage level Lb and a target voltage level Lt succeeding the boosting voltage level Lb. The boosting voltage level Lb may for increasing a rising slope of the sensing voltage Vsen to reduce an ODC sensing period and may be set to be higher than the target voltage level Lt. The target voltage level Lt may be for determining a saturation level "SVdata-Vth" of the sensing voltage Vsen and may be a voltage which is designed based on an input range of the analog-to-digital converter ADC. The boosting voltage level Lb may be set to "target voltage level (Lt)*gain," and the gain may be greater than 1 and less than or equal to 2.

Based on the ODC sensing method performed by the sensing and driving circuit 104 in the second sensing period, one sensing period for all pixels may be considerably reduced compared to the case A (the normal sensing period) of FIG. 7. The sensing and driving circuit 104 may repeatedly sense all pixels a plurality of times by using one sensing period which has been shortened, and thus, the accuracy of compensation and sensing may increase The compensation value generator 105 may receive pixel characteristic values OSO of all pixel lines, based on ODC sensing performed once or a plurality of times, from the sensing and driving circuit 104. The compensation value generator 105 may compare the pixel characteristic values OSO of all pixel lines with pixel characteristic values which are updated and stored latest and may calculate a threshold voltage variation of a driving element for all pixels. Also, the compensation value generator 105 may individually generate a compensation value COMP, which is for compensating for an Ids variation caused by the threshold voltage variation of the driving element, for each of all pixels by using a predetermined compensation algorithm.

The compensation value generator 105 may store the generated compensation value COMP in the memory 106. When the compensation value COMP is updated, the memory 106 may feed back a flag signal FLG to the compensation value generator 105.

The compensation value generator 105 may check the flag signal FLG and may transfer an AC power off command to the power controller 107. The power controller 107 may control an operation of the power circuit 20 to release the supply of an AC power (i.e., the system power), and thus, may complete an off sequence sensing operation.

Figure 8:
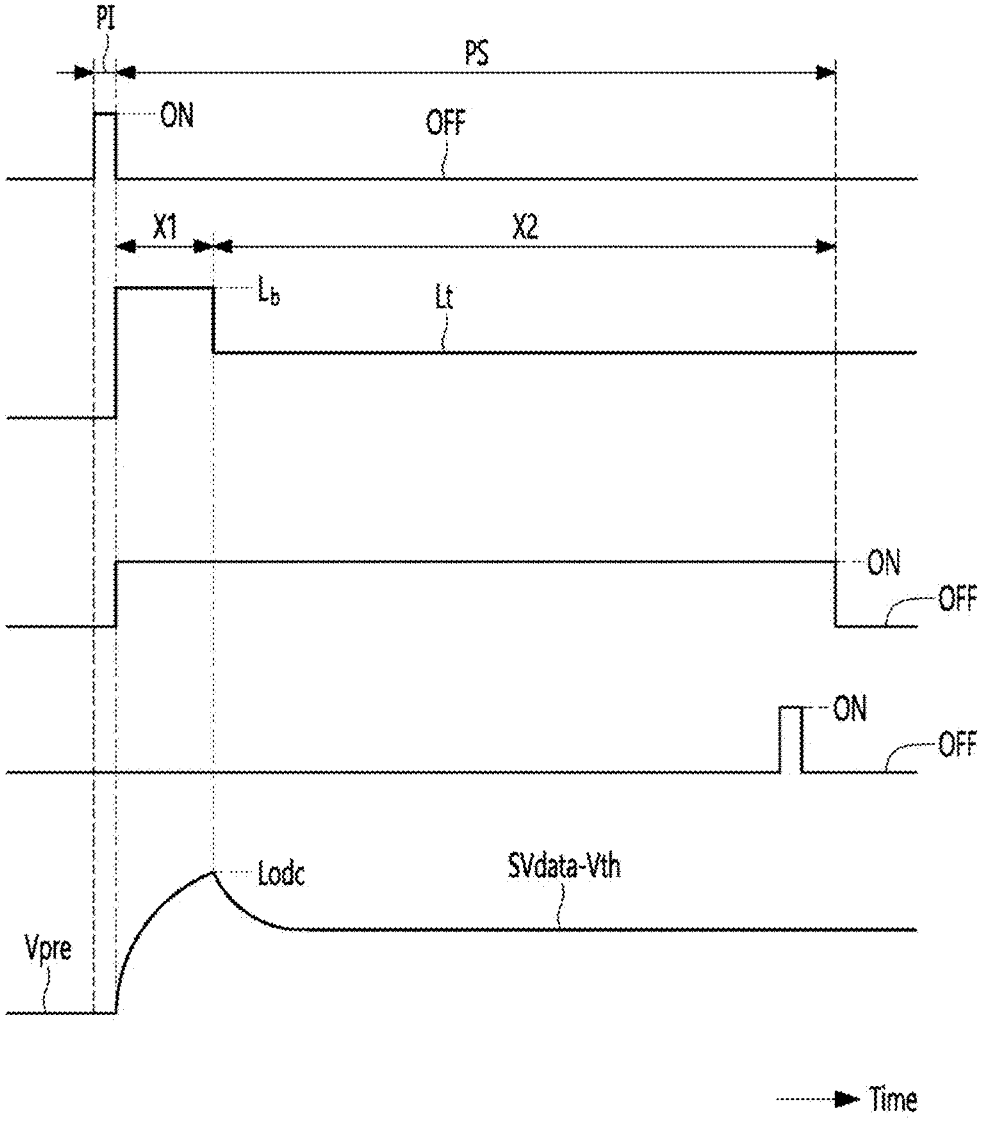
FIG. 8 is a driving waveform diagram for implementing an ODC sensing method according to an embodiment.

FIG. 8 is a driving waveform diagram for implementing an ODC sensing method according to an embodiment.

The sensing and driving circuit 104 (see FIG. 4) according to the present embodiment may perform an ODC sensing operation, based on a driving waveform of FIG. 8.

Referring to FIG. 8, the ODC sensing operation may include an initialization period PI and a sensing period PS.

In the initialization period PI, a reference voltage Vpre may be supplied to a source node of a pixel in response to an initialization control signal SPRE having an on level.

In the sensing period PS, a sensing scan signal SCAN may maintain an on level. The sensing period PS may include a first period X1 where a sensing data voltage SVdata having a boosting voltage level Lb is supplied and a second period X2 where a sensing data voltage SVdata having a target voltage level Lt is supplied. Based on a reduction in a sensing period, the first period X1 may be decreased, compared to the second period X2.

Vgs of a driving element may be higher in the first period X1 than the second period X2. Ids of the driving element may be higher in the first period X1 than the second period X2. A source node voltage (i.e., a sensing voltage Vsen) of the driving element may increase quickly up to an ODC voltage level Lodc which is higher than a saturation level "SVdata-Vth," in the first period X1. The sensing voltage Vsen may be stabilized from the ODC voltage level Lodc to the saturation level "SVdata-Vth" in the second period X2.

In the sensing period PS, the sensing voltage Vsen having the saturation level "SVdata-Vth" may be sampled by a sampling control signal SAM having an on level.

Furthermore, a ratio occupied by the first period X1 and the second period X2 in the boosting voltage level Lb, the target voltage level Lt, and the sensing period may be differently set in at least two of the R, W, G, and B pixels. Accordingly, a threshold voltage of a driving element included in each of the R, W, G, and B pixels may be accurately sensed.

Figure 9:
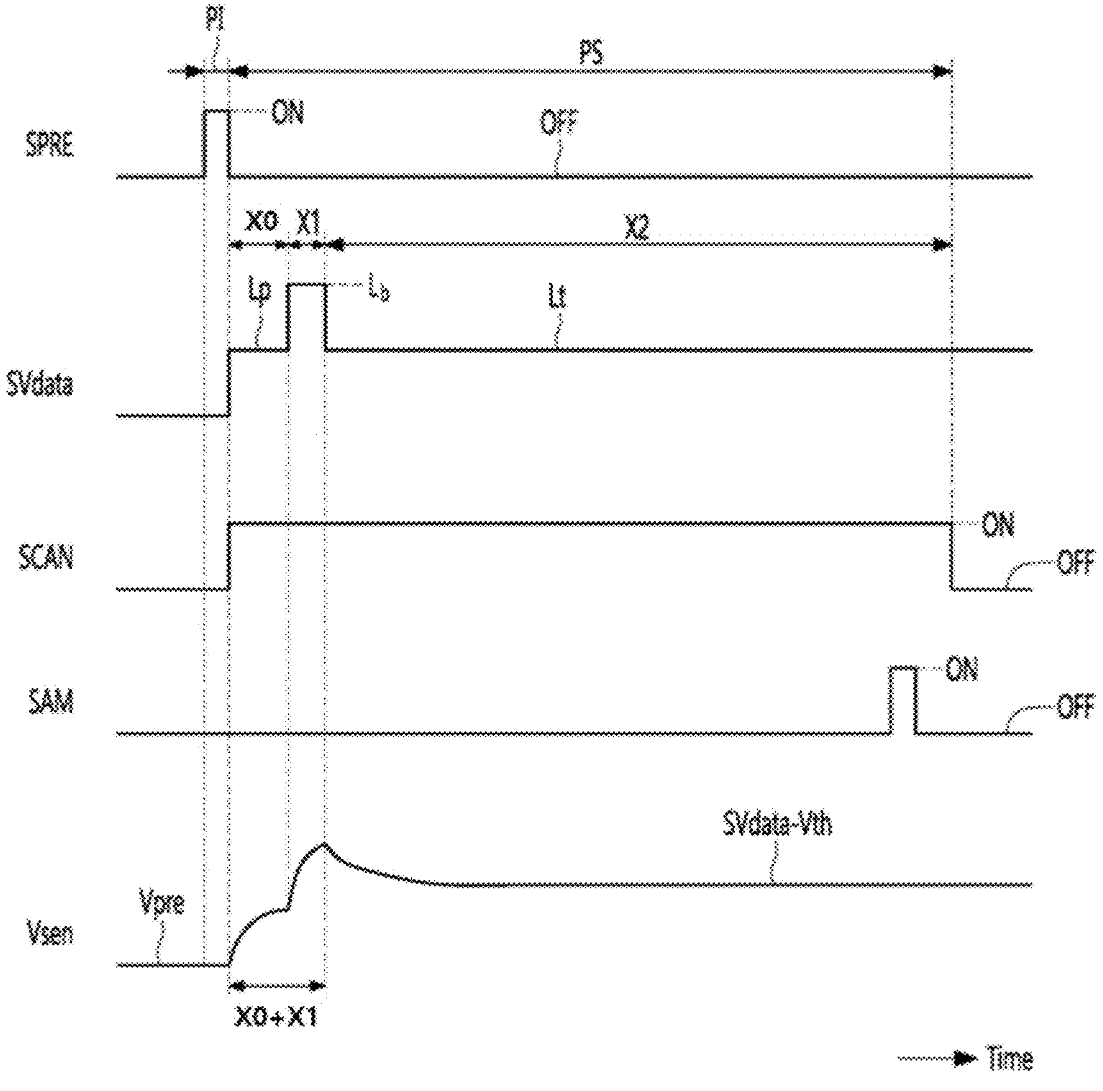
FIG. 9 is a driving waveform diagram for implementing an ODC sensing method according to another embodiment.

FIG. 9 is a driving waveform diagram for implementing an ODC sensing method according to another embodiment.

The sensing and driving circuit 104 (see FIG. 4) according to the present embodiment may perform an ODC sensing operation, based on a driving waveform of FIG. 9.

Referring to FIG. 9, the ODC sensing operation may include an initialization period PI and a sensing period PS.

In the initialization period PI, a reference voltage Vpre may be supplied to a source node of a pixel in response to an initialization control signal SPRE having an on level.

In the sensing period PS, a sensing scan signal SCAN may maintain an on level. In the sensing period PS, a sensing data voltage SVdata may have a precharge voltage level Lp, a boosting voltage level Lb succeeding the precharge voltage level Lp, and a target voltage level Lt succeeding the boosting voltage level Lb. To advance a saturation timing of the sensing voltage Vsen, the boosting voltage level Lb may be set to be higher than the target voltage level Lt. In the sensing period PS, the sensing data voltage SVdata may be applied to the precharge voltage level Lp before being applied at the boosting voltage level Lb, which can decrease sensing distortion caused by coupling between a data line and a sensing line. The precharge voltage level Lp may be lower than the boosting voltage level Lb. The precharge voltage level Lp may be equal to the target voltage level Lt, lower than the target voltage level Lt, or higher than the target voltage level Lt.

The sensing period PS may include a first period X0 where a sensing data voltage SVdata having the precharge voltage level Lp is supplied, a second period X1 where a sensing data voltage SVdata having the boosting voltage level Lb is supplied, and a third period X2 where a sensing data voltage SVdata having the target voltage level Lt is supplied. Based on a reduction in a sensing period, a sum period "X0+X1" of the first period X0 and the second period X1 may be decreased, compared to the third period X2. For example, the sum period "X0+X1" may be set to about 20% of the third period X2.

When an adverse coupling effect caused by the boosting voltage level Lb is small applied between a data line and a sensing line, a ratio occupied by the first period X0 in the sum period "X0+X1" may be equal to a ratio occupied by the second period X1. In this case, the first period X0 and the second period X1 may have a ratio of 1:1.

When an adverse coupling effect caused by the boosting voltage level Lb is largely applied between the data line and the sensing line, a ratio occupied by the first period X0 in the sum period "X0+X1" may be greater than a ratio occupied by the second period X1. In this case, the first period X0 and the second period X1 may have a ratio of 2:1 or a ratio of 3:1.

Furthermore, a ratio occupied by the sum period "X0+X1" and the third period X2 in the precharge voltage level Lp, the boosting voltage level Lb, the target voltage level Lt, and the sensing period may be differently set in at least two of the R, W, G, and B pixels. Accordingly, a threshold voltage of a driving element included in each of the R, W, G, and B pixels may be accurately sensed.

Figure 10:
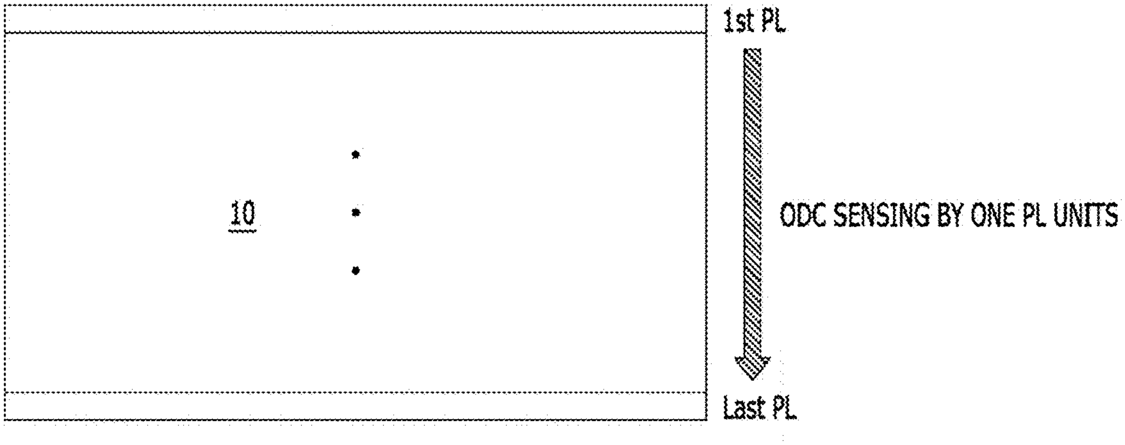
FIG. 10 is a diagram illustrating pixel lines of a display panel on which OCD sensing is performed by one pixel line units.
Figure 11A:
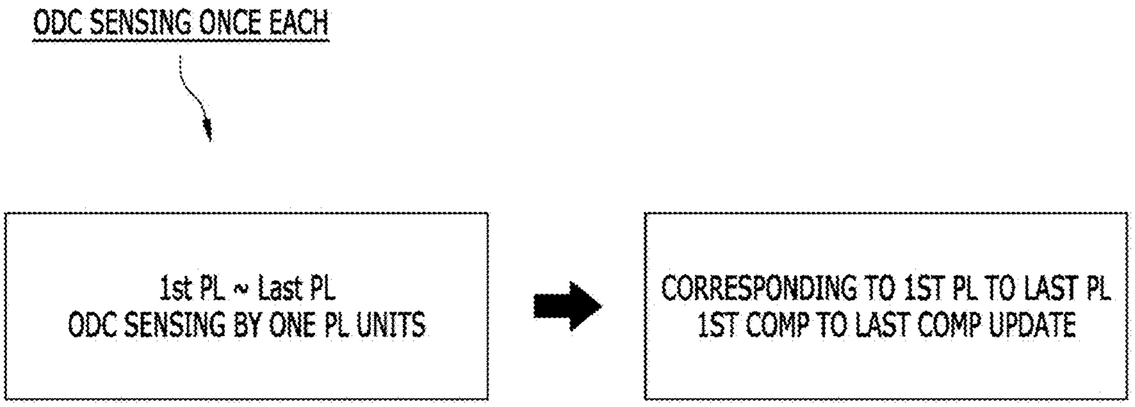
FIG. 11A is a diagram illustrating a process of performing ODC sensing on all pixel lines of a display panel once each.
Figure 11B:
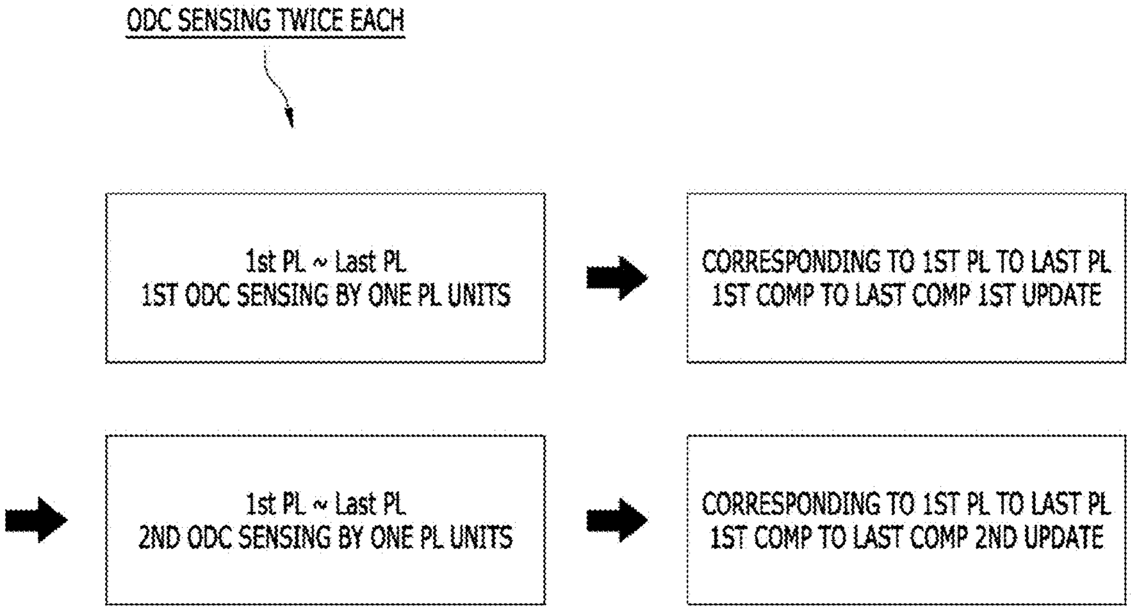
FIG. 11B is a diagram illustrating a process of performing ODC sensing on all pixel lines of a display panel twice each.

FIG. 10 is a diagram illustrating pixel lines of a display panel on which OCD sensing is performed by one pixel line units. FIG. 11A is a diagram illustrating a process of performing ODC sensing on all pixel lines of a display panel once each. FIG. 11B is a diagram illustrating a process of performing ODC sensing on all pixel lines of a display panel twice each.

Referring to FIGS. 10 and 11A, when a sample pixel characteristic value is less than a predetermined threshold value, the sensing and driving circuit 104 (see FIG. 4) according to the present embodiment may perform ODC sensing on pixel characteristic values of all pixels once each up to a last pixel line of the display panel 10 from a first pixel line of the display panel 10. Also, the sensing and driving circuit 104 (see FIG. 4) according to the present embodiment may generate compensation values COMP corresponding to the pixel characteristic values on which the ODC sensing has been performed once each and may update the generated compensation values COMP in a memory.

Referring to FIGS. 10 and 11B, when the sample pixel characteristic value is greater than or equal to the predetermined threshold value, the sensing and driving circuit 104

(see FIG. 4) according to the present embodiment may perform first ODC sensing on pixel characteristic values of all pixels up to the last pixel line of the display panel 10 from the first pixel line of the display panel 10. Also, the sensing and driving circuit 104 (see FIG. 4) according to the present embodiment may generate first compensation values COMP corresponding to the pixel characteristic values on which the first ODC sensing has been performed and may update the first compensation values COMP in the memory.

Referring to FIGS. 10 and 11B, when the sample pixel characteristic value is greater than or equal to the predetermined threshold value, the sensing and driving circuit 104 (see FIG. 4) according to the present embodiment may perform second ODC sensing on pixel characteristic values of all pixels up to the last pixel line of the display panel 10 from the first pixel line of the display panel 10. Also, the sensing and driving circuit 104 (see FIG. 4) according to the present embodiment may generate second compensation values COMP corresponding to the pixel characteristic values on which the second ODC sensing has been performed and may update the second compensation values COMP in the memory.

The present embodiment may realize the following effects.

The driving device of the electroluminescent display apparatus according to the present embodiment may perform a sensing operation, based on a sensing data voltage having multi-voltage levels, and thus, may considerably shorten one sensing period corresponding to all pixels. When a pixel characteristic value variation of a display panel is large, the driving device of the electroluminescent display apparatus may repeatedly sense all pixels a plurality of times by using one sensing period which has been shortened, and thus, the accuracy of compensation and sensing may increase.

The effects according to the present disclosure are not limited to the above examples, and other various effects may be included in the specification.

While the present disclosure has been particularly shown and described with reference to example embodiments thereof, it will be understood by those of ordinary skill in the art that various changes in form and details may be made therein without departing from the spirit and scope of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driving device of an electroluminescent display apparatus including a display panel that has a plurality of pixel lines each including a set of pixels, the driving device comprising:

a pixel line determiner configured to select a representative pixel line based on a position at which an accumulation stress of displaying of an input image is largest, from the plurality of pixel lines;

an over driving control (ODC) controller configured to select a sample pixel characteristic value from pixel characteristic values of the representative pixel line and selectively output a first ODC control signal or a second ODC control signal, based on a magnitude of the sample pixel characteristic value; and a sensing and driving circuit configured to pre-sense pixel characteristic values of the representative pixel line in the first sensing period, perform ODC sensing on the pixel characteristic values of the plurality of pixel lines once for each according to the first ODC control signal in a second sensing period succeeding the first sensing period, and perform the ODC sensing on the pixel characteristic values of the plurality of pixel lines a plurality of times for each according to the second ODC control signal in the second sensing period, wherein a sensing data voltage supplied to each pixel of the plurality of pixel lines has multi-voltage levels in the second sensing period for the ODC sensing.

2. The driving device of claim 1, wherein, when the sample pixel characteristic value is less than a threshold value, the ODC controller outputs the first ODC control signal, and when the sample pixel characteristic value is greater than or equal to the threshold value, the ODC controller outputs the second ODC control signal.

3. The driving device of claim 1, wherein the ODC controller selects, as the sample pixel characteristic value, a highest value of the pixel characteristic values of the representative pixel line.

4. The driving device of claim 1, wherein the sensing data voltage has a boosting voltage level and a target voltage level succeeding the boosting voltage level, and the boosting voltage level is higher than the target voltage level.

5. The driving device of claim 4, wherein the second sensing period comprises a first period where the boosting voltage level is supplied and a second period where the target voltage level is supplied, and the first period is shorter than the second period.

6. The driving device of claim 5, wherein the pixels comprise an R pixel configured to emit light of a red color, a W pixel configured to emit light of a white color, a G pixel configured to emit light of a green color, and a B pixel configured to emit light of a blue color, and a ratio occupied by the first period and the second period in the boosting voltage level, the target voltage level, and the sensing period is differently set in at least two of the R, W, G, and B pixels.

7. The driving device of claim 1, wherein the sensing data voltage has a precharge voltage level, a boosting voltage level succeeding the precharge voltage level, and a target voltage level succeeding the boosting voltage level, and the boosting voltage level is higher than the target voltage level, and the precharge voltage level is lower than the boosting voltage level.

8. The driving device of claim 7, wherein the second sensing period comprises a first period where the precharge voltage level is supplied, a second period where the boosting voltage level is supplied, and a third period where the target voltage level is supplied, and a sum period of the first period and the second period is shorter than the third period.

9. The driving device of claim 8, wherein, in the sum period, a ratio occupied by the first period is higher than or equal to a ratio occupied by the second period.

10. The driving device of claim 8, wherein the pixels comprise an R pixel configured to emit light of a red color, a W pixel configured to emit light of a white color, a G pixel configured to emit light of a green color, and a B pixel configured to emit light of a blue color, and a ratio occupied by the sum period and the third period in the precharge voltage level, the boosting voltage level, the target voltage level, and the second sensing period is differently set in at least two of the R, W, G, and B pixels.

11. A driving method of an electroluminescent display apparatus including a display panel that has a plurality of pixel lines each including a set of pixels, the driving method comprising:

selecting a representative pixel line, disposed at a position at which an accumulation stress caused by repetitive display of an input image is largest, from the plurality of pixel lines;

pre-sensing pixel characteristic values of the representative pixel line in a first sensing period;

selecting a sample pixel characteristic value from the pixel characteristic values of the representative pixel line and selectively outputting a first over driving control (ODC) control signal or a second ODC control signal, based on a magnitude of the sample pixel characteristic value; and performing ODC sensing on the pixel characteristic values of the plurality of pixel lines once for each according to the first ODC control signal or performing the ODC sensing on the pixel characteristic values of the plurality of pixel lines a plurality of times for each according to the second ODC control signal, in a second sensing period succeeding the first sensing period, wherein a sensing data voltage supplied to each pixel of the plurality of pixel lines has two or more voltage levels, in the second sensing period for the ODC sensing.

12. The driving method of claim 11, wherein the sample pixel characteristic value is selected as a highest value among the pixel characteristic values of the representative pixel line.

13. The driving method of claim 11, wherein the sensing data voltage has a boosting voltage level and a target voltage level succeeding the boosting voltage level, and the boosting voltage level is higher than the target voltage level.

14. The driving method of claim 13, wherein the second sensing period comprises a first period where the boosting voltage level is supplied and a second period where the target voltage level is supplied, and the first period is shorter than the second period.

15. The driving method of claim 11, wherein the sensing data voltage has a precharge voltage level, a boosting voltage level succeeding the precharge voltage level, and a target voltage level succeeding the boosting voltage level, and the boosting voltage level is higher than the target voltage level, and the precharge voltage level is lower than the boosting voltage level.

16. The driving method of claim 15, wherein the second sensing period comprises a first period where the precharge voltage level is supplied, a second period where the boosting voltage level is supplied, and a third period where the target voltage level is supplied, and a sum period of the first period and the second period is shorter than the third period.

17. The driving method of claim 16, wherein, in the sum period, a ratio occupied by the first period is higher than or equal to a ratio occupied by the second period.

18. A driving method of an electroluminescent display apparatus including a display panel that has a plurality of pixel lines each including a set of pixels, the driving method comprising:

selecting a representative pixel line from the plurality of pixel lines based on a position at which an accumulation stress of displaying an input image is largest;

sensing a pixel characteristic value of the representative pixel line in a first sensing period;

outputting a first over driving control (ODC) control signal or a second ODC control signal based on the pixel characteristic value of the representative pixel line;

performing ODC sensing on pixel characteristic values of the plurality of pixel lines once for each pixel characteristic in response to the first ODC control signal in a second sensing period succeeding the first sensing period; and performing the ODC sensing on the pixel characteristic values of the plurality of pixel lines a plurality of times for each pixel characteristic in response to the second ODC control signal in the second sensing period.

19. The method of claim 18, wherein a sensing data voltage supplied to each pixel of the plurality of pixel lines has two or more voltage levels in the second sensing period for the ODC sensing.

20. The method of claim 18, wherein the outputting the first ODC control signal or the second ODC control signal based on the pixel characteristic value of the representative pixel line includes:

in response to the pixel characteristic value of the representative pixel line is less than a threshold value, outputting the first ODC control signal, and in response to the pixel characteristic value of the representative pixel line is greater than or equal to the threshold value, outputting the second ODC control signal.

* * * * *